UNITED STATES PATENT OFFICE.

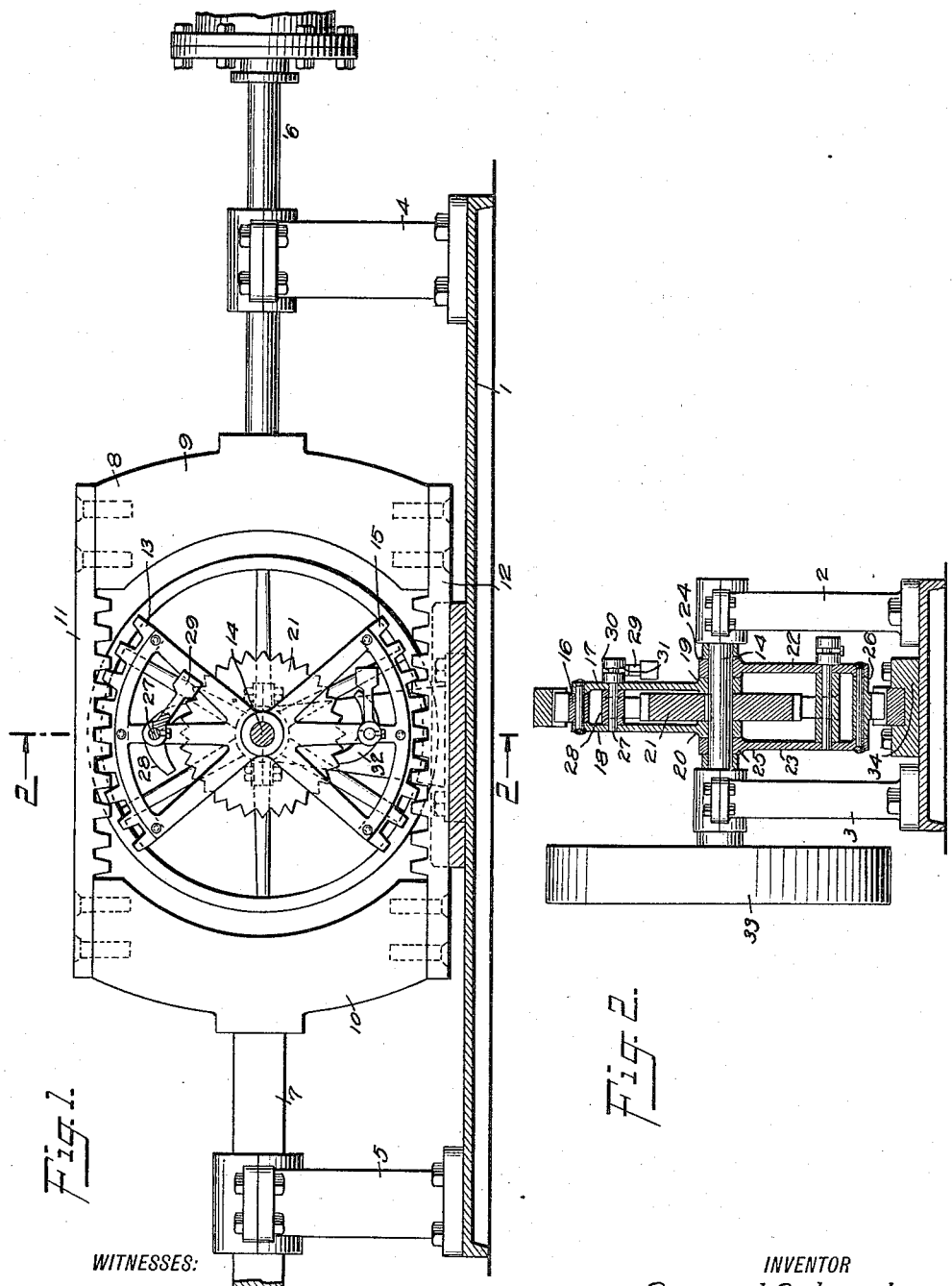

SAMUEL SYLVESTER, OF LISBON FALLS, MAINE.

MECHANISM FOR CONVERTING RECIPROCATING MOTION TO ROTARY MOTION.

1,163,485.   Specification of Letters Patent.   Patented Dec. 7, 1915.

Application filed May 12, 1915. Serial No. 27,567.

*To all whom it may concern:*

Be it known that I, SAMUEL SYLVESTER, a citizen of the United States, and a resident of Lisbon Falls, in the county of Androscoggin and State of Maine, have invented a new and Improved Mechanism for Converting Reciprocating Motion to Rotary Motion, of which the following is a full, clear, and exact description.

This invention relates to machines for transmitting reciprocating motion into rotary and has for an object the provision of an improved simplified structure which may be readily reversed at any time so as to cause a rotary movement in either direction.

Another object in view is to provide a machine formed with a reciprocating drive acting at opposite points alternately for producing a rotary movement in a rotating member arranged adjacent the reciprocating member.

A still further object in view is to provide a mechanism which will transmit a comparatively slow reciprocating movement into a rotary movement with a minimum loss of power.

In the accompanying drawings:—Figure 1 is a side view of a device embodying the invention, certain of the parts being broken away for better illustrating the construction; Fig. 2 is a section through Fig. 1 on line 2—2.

Referring to the accompanying drawings by numerals, 1 indicates a base of any suitable kind on which supports 2 and 3 are mounted and also end supports 4 and 5. Support 4 supports and guides the piston rod 6 while support 5 supports and guides the guiding bar 7, which bar is preferably formed rectangular in cross section in order to assist in preventing any twisting or turning action of the power member 8. Power member 8 comprises ends 9 and 10 to which are rigidly secured racks 11 and 12, said racks facing each other, as shown in Fig. 1. It is evident that the ends and the racks could, if desired, be made from a single piece of material or a number of pieces, as may be desired.

The rack 11 meshes with a segmental gear 13 loosely mounted on shaft 14, while rack 12 continually meshes with a segmental gear 15 loosely mounted on shaft 14. As shown in Fig. 2 the segmental gear 13 is provided with an arc-shaped rack 16 rigidly connected with a pair of segmental frames 17 and 18, which frames are provided with journal members 19 and 20 surrounding shaft 14. The frames 17 and 18 straddle the ratchet wheel 21, while the frames 22 and 23 of the segmental gear 15 straddle the ratchet wheel 21 and the bearings 19 and 20, as these frames are provided with bearings 24 and 25. The frames 22 and 23 are rigidly connected to an arc-shaped rack 26 which, together with the frames 22 and 23, form the segmental gear 15. By this means the segmental gears are properly mounted and are independent of each other. A pin 27 extends through the frames 17 and 18, as shown in Fig. 2, and is loosely mounted therein but is rigidly secured to a double-ended pawl 28 which is adapted to engage the teeth of the ratchet wheel 21.

A weighted arm 29 is loosely mounted on one end of shaft 27, said arm being formed with a slot 30 through which extends a binding member or set screw 31. The binding member or set screw 31 limits the movement of the weighted arm 29 on the pin 27. Preferably the binding member or set screw 31 is tightened when in the position shown in Fig. 1 and thereby causes the weighted arm to cause one end of pawl 28 to engage the ratchet wheel 21, as shown in Fig. 1, continually. When it is desired to reverse the rotation of ratchet wheel 21 arm 29 is thrown or swung over to its opposite extreme position and then the set screw 31 again tightened. This will cause the opposite end of pawl 28 to engage the ratchet wheel 21 and thereby reverse the movement of the ratchet wheel with the same reciprocatory movement of member 28.

A pawl 32 is provided for the segmental gear 15, said pawl and associated parts being similar to pawl 28 and associated parts and acting in a similar manner so that no additional description will be necessary. It is to be understood that when the member 8 is moving in one direction the pawl 32 is operating in order to turn the ratchet wheel 21, and when member 8 is moving in the opposite direction the pawl 28 is operating to rotate wheel 21, thus providing an almost continuous movement of the wheel 21, shaft 14, power wheel 33 and parts connected therewith.

The shaft 14 is journaled in suitable bearing boxes in the members 2 and 3 and has the wheel 33 rigidly secured thereto in any desired manner so that as the shaft is rotated this wheel and any mechanism connected therewith will be moved. It will be noticed that between the members 2 and 3 is arranged a guide 34 in which the rack 12 slides, which, together with piston rod 6 and bar 7, prevents any undue side movement of member 8.

What I claim is:—

1. In a device of the character described, a reciprocating member provided with a pair of rack bars, a driven shaft extending between said rack bars, a ratchet wheel mounted on said shaft substantially in alinement with said rack bars, a segmental gear meshing with one of said rack bars and provided with journal members straddling said ratchet wheel, said journal members surrounding said driven shaft, a second segmental gear meshing with the other of said rack bars, said second mentioned segmental gear being provided with journal members straddling said ratchet wheel and part of the journal members of the opposite segmental gear, said second mentioned journal members engaging said driven shaft, a pawl connected with each of said segmental gears, said pawls engaging said ratchet wheel operating in opposite directions, whereby when said rack bars are reciprocated said ratchet wheel and said driven shaft will be rotated.

2. In a device of the character described, a pair of reciprocating rack bars, a driven shaft extending between said rack bars, a segmental gear for each of said rack bars, each of said segmental gears being provided with depending legs having journal members surrounding said driven shaft, a ratchet wheel rigidly secured to said shaft, said ratchet wheel being arranged in the same plane as said rack bars and said segmental gears, and a double-ended pawl pivotally mounted on each of said segmental gears, said pawls engaging said ratchet wheel whereby said ratchet wheel may be rotated in either direction according to the particular end of the pawl engaging the ratchet wheel.

In testimony whereof I have signed my name to this specification in the presence of two subscribing witnesses.

SAMUEL SYLVESTER.

Witnesses:
 GEORGE R. FOSTER,
 ALICE C. NORTON.

Copies of this patent may be obtained for five cents each, by addressing the "Commissioner of Patents, Washington, D. C."